United States Patent
Takechi

(10) Patent No.: US 9,780,885 B2
(45) Date of Patent: Oct. 3, 2017

(54) OPTICAL RECEIVER AND OPTICAL AXIS ALIGNMENT METHOD THEREOF

(71) Applicant: Sumitomo Electric Industries, Ltd., Osaka-shi (JP)

(72) Inventor: Masaru Takechi, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/586,864

(22) Filed: May 4, 2017

(65) Prior Publication Data

US 2017/0237504 A1 Aug. 17, 2017

Related U.S. Application Data

(62) Division of application No. 14/310,846, filed on Jun. 20, 2014.

(30) Foreign Application Priority Data

Jun. 24, 2013 (JP) .................................. 2013-132042

(51) Int. Cl.
   *H04B 10/06* (2006.01)
   *H04B 10/61* (2013.01)

(52) U.S. Cl.
   CPC ....... *H04B 10/614* (2013.01); *H04B 10/6151* (2013.01)

(58) Field of Classification Search
   CPC .............. H04B 10/614; H04B 10/6151; H04B 10/611; H04B 10/63; H04B 10/64; H04B 10/66; H04B 10/671

USPC ........ 398/212, 214, 207, 204, 203, 202, 141
   See application file for complete search history.

(56) References Cited

U.S. PATENT DOCUMENTS

| | | | | |
|---|---|---|---|---|
| 6,948,859 B2* | 9/2005 | Anderson | ............ | G02B 6/4207 385/88 |
| 8,634,718 B2* | 1/2014 | Evans | ................ | H04B 10/2572 385/11 |
| 2013/0272720 A9* | 10/2013 | Dunn | ................... | G02B 6/0006 398/182 |

OTHER PUBLICATIONS

Notice of Allowance and Allowability in U.S. Appl. No. 14/310,846, dated Jun. 29, 2017 [Related pplication, provided in IFW].

* cited by examiner

*Primary Examiner* — M. R. Sedighian
(74) *Attorney, Agent, or Firm* — Venable LLP; Michael A. Sartori; Laura G. Remus

(57) ABSTRACT

An optical receiver comprises a package provided with an input window; a polarization-maintaining optical fiber fixable to the input window; a polarization beam splitter, disposed on the package, for inputting light outputted from the polarization-maintaining optical fiber and outputting first output light and second output light having respective polarization directions different from each other; a beam splitter, disposed on the package, for splitting the first output light; a first light-receiving element, optically coupled to the beam splitter, having two light-receiving parts corresponding to two kinds of the output light split by the beam splitter; and a second light-receiving element, disposed on the package, for receiving the second output light.

5 Claims, 13 Drawing Sheets

OPTICAL RECEIVER AND OPTICAL AXIS ALIGNMENT METHOD THEREOF

CROSS-REFERENCE TO RELATED APPLICATIONS

This application is a Divisional of U.S. patent application Ser. No. 14/310,846, filed Jun. 20, 2014, which claims the benefit of Japanese Patent Application No. 2013-132042, filed Jun. 24, 2013.

TECHNICAL FIELD

The present invention relates to an optical receiver and an optical axis alignment method thereof.

BACKGROUND

Coherent optical communication systems have been known as high-speed, large-capacity optical communication systems. An optical receiver of a coherent optical communication system separates signal light inputted from a single-mode optical fiber into X-polarized light and Y-polarized light orthogonal to each other by using a polarization beam splitter (PBS). Thereafter, an optical hybrid makes the signal light interfere with local oscillator light (LO light) inputted from a polarization-maintaining optical fiber. Thereafter, a light-receiving element (e.g., photodiode (PD)) arranged dower stream of the optical hybrid converts an optical signal into an electric signal.

Known as a method for aligning an optical axis of the polarization-maintaining optical fiber is one comprising inserting a polarizer between the light-receiving element and the polarization-maintaining optical fiber and adjusting an angle of the polarization-maintaining optical fiber such that the light-receiving element attains the maximum output current in this state. For suppressing light reflection, an end face of the polarization-maintaining optical fiber may form a predetermined angle (e.g. about 8°) with a plane perpendicular to the optical axis.

SUMMARY

Conventional optical receivers have a problem that the angle of the polarization-maintaining optical fiber is hard to adjust accurately when aligning the optical axis thereof.

In view of the above-mentioned problem, it is an object of the present invention to provide an optical receiver and its optical axis alignment method which can increase the accuracy of optical axis alignment in the polarization-maintaining optical fiber.

The optical information processing unit in accordance with one aspect of the present, invention comprises a first optical input; a second optical input; a polarization beam splitter receives the first optical input, and outputs first and second output lights having polarization direction different from each other; an optical processing unit receives the first output light and the second optical input aligned with a polarization direction of the first output light, and produces an information signal from the first output light and the second optical input; an optical-electrical signal converter receives the second output light.

In the above-mentioned structure, the polarization beam splitter is inputting light outputted from a polarization-maintaining optical fiber.

In the above-mentioned structure, furthering another optical-electrical signal converter receives the first output light.

In the above-mentioned structure, optical-electrical signal converter is coupled directly to the polarization beam splitter with no optical element interposed therebetween.

In the above-mentioned structure, the polarization-maintaining optical fiber fixable to input window in a package, an end face on the package side of the polarization-maintaining optical fiber is tilted by an angle of at least 4 but not more than 12° with respect to an optical axis.

In the above-mentioned structure, the optical processing unit is an optical hybrid another optical-electrical signal converter photoelectrically convert the interference light outputted from the optical hybrid.

In the above-mentioned structure, the package provided with another input window, a no polarization-maintaining optical fiber fixable to the another input window.

In the above-mentioned structure, furthering the optical hybrid for inputting light outputted from the no polarization-maintaining optical fiber fixable.

In the above-mentioned structure, furthering a transimpedance amplifier, combining and amplifying paired positive and negative components of electric signals outputted from another optical-electrical signal convener.

In the above-mentioned structure, furthering an external local oscillator light is inputted into the polarization-maintaining optical fiber fixable.

The optical axis alignment method of an optical receiver in accordance with one aspect of the present invention is an optical axis alignment method of an optical receiver comprising a package provided with an input window; a polarization-maintaining optical fiber fixable to the input window; comprises a first step of adjusting an angle of the polarization-maintaining optical fiber according to results of detection by an optical-electrical signal converter; a second step of removing the polarization beam splitter and the optical-electrical signal converter from the package while keeping the angle of the polarization-maintaining optical fiber.

In the above-mentioned optical axis alignment method, furthering a polarization beam splitter for inputting light outputted from the polarization-maintaining optical fiber and outputting first output light as TE-polarized light and second output light as TM-polarized light; a third step of mounting a polarizer for inputting the TE-polarized light outputted from the polarization-maintaining optical fiber and another optical-electrical signal converter for receiving output light from the polarizer onto the package while keeping the angle of the polarization-maintaining optical fiber; and a fourth step of aligning optical axes of the polarization-maintaining optical fiber, polarizer, and another optical-electrical signal converter while keeping the angle of the polarization-maintaining optical fiber.

In the above-mentioned optical axis alignment method, the first step of a light being inputted in the polarization maintaining optical fiber, that has an external local oscillator light.

The optical axis alignment method of an optical receiver in accordance with another aspect of the present invention is an optical axis alignment method of an optical receiver comprising a package provided with first and second input windows; a polarization-maintaining optical fiber fixable to the second input window; comprises a first step of adjusting an angle of the polarization-maintaining optical fiber according to results of detection by the optical-electrical signal converter; a second step of removing the polarization-maintaining optical fiber from the second input window and fixing the polarization-maintaining optical fiber to the first input window while keeping the angle of the polarization-maintaining optical fiber; and a third step of aligning optical axes of the polarization-maintaining optical fiber, polarizer, and optical-electrical signal converter while keeping the angle of the polarization-maintaining optical fiber.

In the above-mentioned optical axis alignment method, the second step adjusts the angle of the polarization-maintaining optical fiber such that an amount of light received by the optical-electrical signal converter element is at least a first threshold while an amount of light received by another optical-electrical signal converter is not greater than a second threshold.

In the above-mentioned optical axis alignment method, furthering a polarization beam splitter for inputting light outputted from the polarization-maintaining optical fiber and outputting first output light as TE-polarized light and second output light as TM-polarized light; the TE-polarized light outputted from the polarization-maintaining optical fiber has an angle of polarization of 10° or less.

In the above-mentioned optical axis alignment method, the second step of moving the polarization-maintaining optical fiber from the second input window by sliding the polarization-maintaining optical fiber while keeping its angle.

In the above-mentioned optical axis alignment method, the first step of a light being inputted in the polarization-maintaining optical fiber, that has an external local oscillator light.

DETAILED DESCRIPTION

In the following, embodiments of the present invention will be explained.

Figure 1:
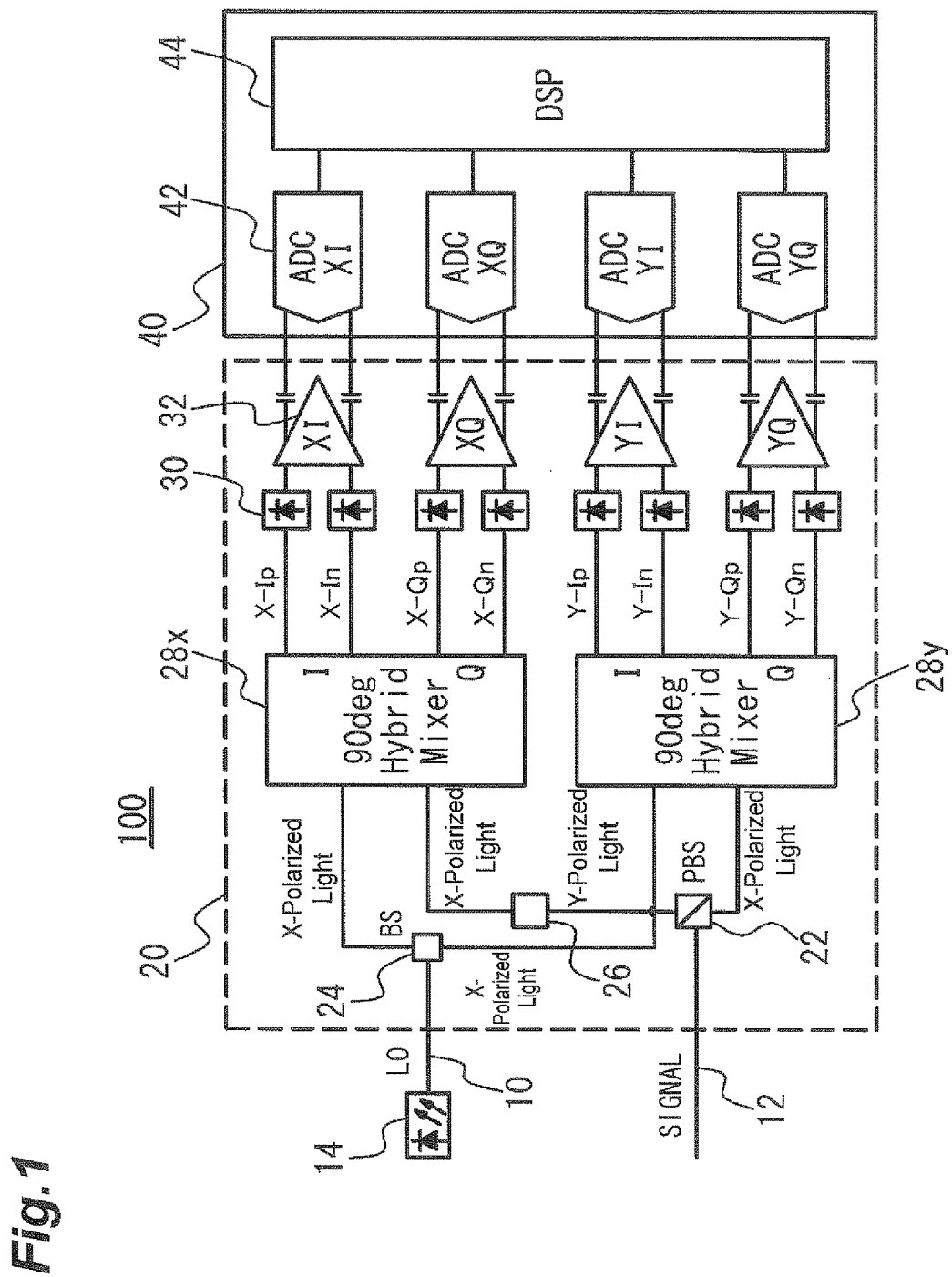
FIG. 1 is an overall block diagram of an optical receiver in accordance with first to third embodiments.

FIG. 1 is an overall block diagram of the optical receiver in accordance with the first to third embodiments. This optical receiver 100 is an optical receiver used for coherent optical communications. The optical receiver 100 comprises an optical signal processing unit 20 for processing optical signals and an electric signal processing, unit 40, disposed downstream of the optical signal processing unit 20, for processing electric signals.

Figure 2:
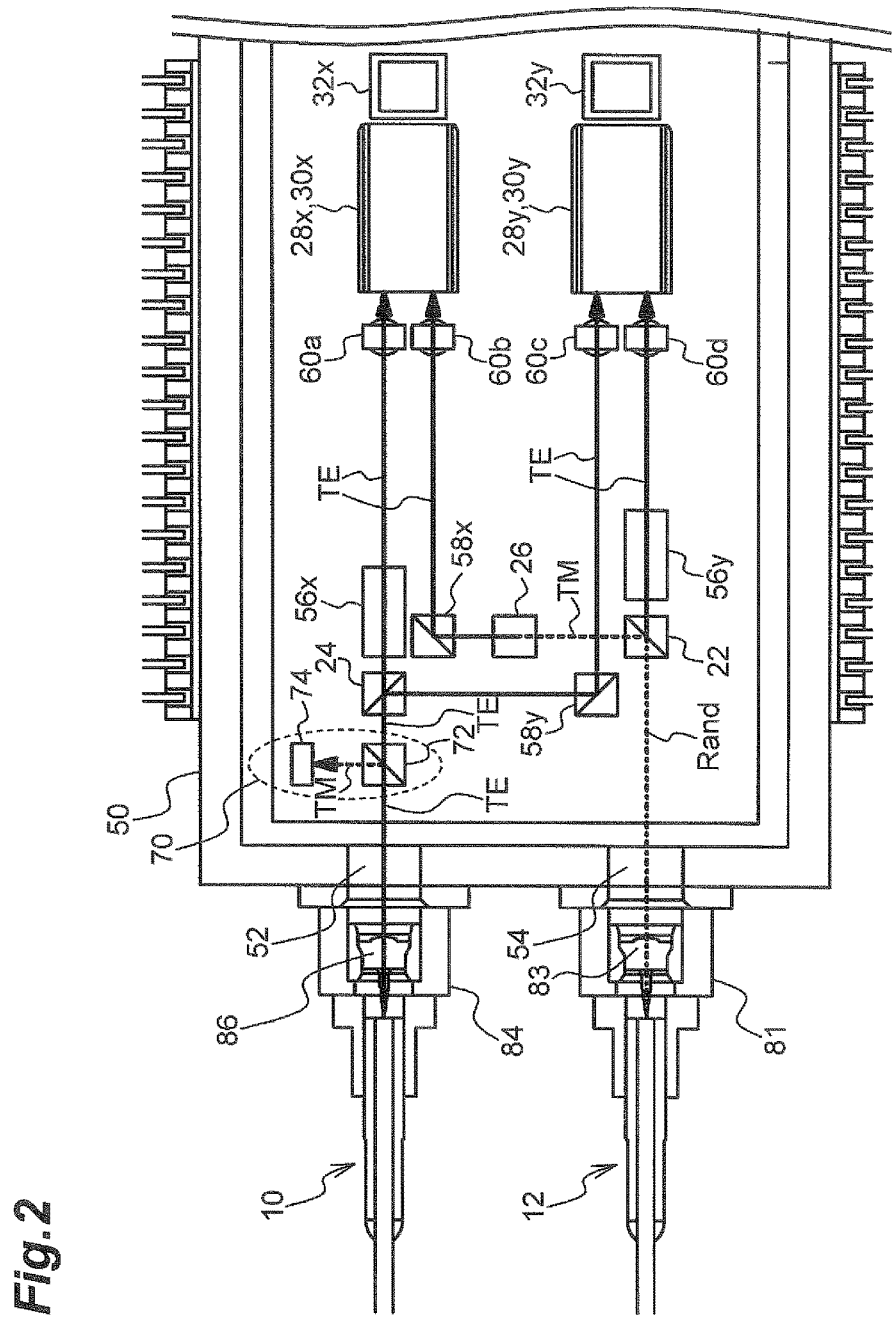
FIG. 2 is a schematic view illustrating, a process of optical axis alignment of the optical receiver in accordance with the first embodiment.

The optical signal processing unit 20 includes a polarization beam splitter (PBS) 22, a beam splitter (BS) 24, a polarization rotator 26, optical hybrids(optical processing unit)28x, 28y, light-receiving units 30, and amplifiers 32 (amplifiers 32x, 32y illustrated in FIG. 2). The optical signal processing unit 20 further includes optical elements such as skew adjustment elements, lenses, mirrors, and polarizers (each illustrated in FIG. 2) which are omitted in FIG. 1. The electric signal processor 40 includes an analog-digital converter (ADC) 42 and a digital signal processor (DSP) 44.

The polarization beam splitter 22 splits signal light (SIGNAL) introduced by a single-mode optical fiber (SMF) 12 into X-polarized light and Y-polarized light which are orthogonal to each other. The X-polarized light enters the optical hybrid 28y on the Y side, while the Y-polarized light has its plane of polarization rotated 90° by the polarization rotator 26 so as to become X-polarized light, which then enters the optical hybrid 28x on the X side. For example, TM light and TE light may be used as the X-polarized light and Y-polarized light, respectively, or vice versa.

The beam splitter 24 splits local oscillator light (LO light) inputted by a polarization-maintaining optical fiber (PMF) 10 from an external local oscillator light source device 14 into X and Y sides. The local oscillator light (LO light) is preset to X-polarized light and enters the optical hybrids 28x, 28y on the X and Y sides.

Each of the optical hybrids 28x, 28y causes the incident signal light and local oscillator light to interfere with each other in the internal light circuit and outputs the resulting interference light from four ports. Each of the optical hybrids 28x, 28y may be constituted by a silica-based planar lightwave circuit (PLC), for example. The X-polarized signal light (SIGNAL) is combined with the local oscillator light (LO) in the optical hybrid 28x and then is split, into positive (p) and negative (n) in-phase I and quadrature Q components, which are outputted as four optical signals (X-Ip, X-In, X-Qp, X-Qn). Similarly, the Y-polarized signal light is combined with the local oscillator light (LO light) in the optical hybrid 28y and then is split into positive (p) and negative (n) in-phase I and quadrature Q components, which are outputted as four optical signals (Y-Ip, Y-in, Y-Qp, Y-Qn).

The light-receiving elements 30 photoelectrically convert the interference light(information signal) outputted from the optical hybrids 28x, 28y into analog electric signals. Each light-receiving element. 30 includes a photodiode (PD), for example. The amplifiers 32 combine and amplify paired positive and negative components of electric signals outputted from the light-receiving elements 30. Each amplifier 32 includes a transimpedance amplifier (TIA), for example. The amplified electric signals are outputted from electric output terminals of the optical signal processing unit 20 and inputted to the electric signal processing unit 40.

In the electric signal processor 40, the analog-digital converters 42 convert the analog electric signals outputted from the optical signal processing unit 20 into digital signals by analog-digital conversion. The digital signal processor 44 subjects the converted digital signals to various kinds of signal processing such as signal demodulation. The foregoing processing can perform digital coherent communications.

First Embodiment

FIG. 2 is a schematic view illustrating an inner structure of the optical receiver in accordance with the first embodiment. FIG. 2 illustrates only a structure corresponding to the optical signal processing unit 20 while omitting the electric signal processing unit 40. Members in common with FIG. 1 are referred to with the same signs while omitting their overlapping descriptions.

As illustrated in FIG. 2, a package 50 containing the optical signal processing, unit 20 is formed with two input windows 52, 54 for connecting and fixing optical cables. In the following, of the two input windows 52, 54, one which fixes the polarization-maintaining optical fiber 10 and introduces the local oscillator light (LO light) will be referred to as first input window 52, and the other which fixes the single-mode optical fiber 12 and introduces the signal light (SIGNAL) as second input window 54. In addition to the structure explained with FIG. 1, skew adjustment elements 56x, 56y, mirrors 58x, 58y, lenses 60a to 60d, and a light regulation unit 70 are arranged within the package 50. The light regulation unit 70 is constituted by a polarization beam splitter 72 and a light-receiving element 74(an optical-electrical signal converter).

The polarization-maintaining optical fiber 10 is fixed to the first input window 52. The TE light emitted from the polarization-maintaining optical fiber 10 is converted into collimated light by a lens 86 within a lens holder 84 and then enters the polarization beam splitter 72 within the package 50. The light having advanced straight through the polarization beam splitter 72 becomes TE light, which is inputted to the beam splitter 24. The light reflected 90° by the polarization beam splitter 72 becomes TM light, which is inputted to the light-receiving element 74. The TE light emitted from the polarization-maintaining optical fiber 10 may have an angle of polarization of 10° or less, for example.

The light having advanced straight through the beam splitter 24 passes through the skew adjustment element 56x and is condensed by the collimator lens 60a, so as to enter the optical hybrid 28x on the X side. The structure indicated by signs 28x, 30x in the drawing is one integrating the optical hybrid 28x and light-receiving element 30x on the X side.

On the other hand, the light reflected 90° by the beam splitter 24 is reflected 90° again by the mirror 58y and then condensed by the collimator lens 60c, so as to enter the optical hybrid 28y on the Y side. The structure indicated by signs 28y, 30y in the drawing is one integrating the optical hybrid 28y and light-receiving element 30y on the Y side.

The single-mode optical fiber 12 is fixed to the second input window 54. The light emitted from the single-mode optical fiber 12 is converted into collimated light by a lens 83 within a lens holder 81 and then enters the polarization beam splitter 22 within the package 50. The light entering the polarization beam splitter 22 has random polarization directions (indicated by Rand). The light having advanced straight through the polarization beam splitter 22 becomes TE light, which passes through the skew adjustment element 56y and then is condensed by the collimator lens 60d, so as to enter the optical hybrid 28y on the Y side.

On the other hand, the light reflected 90° by the polarization beam splitter 22 once becomes TM light, but is converted into YE light by passing through the polarization rotator 26. It is reflected 90° again by the mirror 58x and then condensed by the collimator lens 60b, so as to enter the optical hybrid 28x on the X side.

Of the local oscillator light LO coming from the polarization-maintaining optical fiber 10, the part entering the Y-side optical hybrid 28y has an optical path length longer than that of the part entering the X-side optical hybrid 28x by the distance between the beam splitter 24 and the mirror 58y. Therefore, the skew adjustment element 56x arranged on the X side delays the phase of light on the X side such that the local oscillator light has the same optical path length on the X and Y sides.

Of the signal light coming from the single-mode optical fiber 12, the part entering the X-side optical hybrid 28x has an optical path length longer than that of the part entering the Y-side optical hybrid 28y by the distance between the polarization beam splitter 22 and the mirror 58x. Therefore, the skew adjustment element 56y arranged on the Y side delays the phase of light on the Y side such that the signal light has the same optical path length on the X and Y sides. As the skew adjustment elements 56x, 56y, materials (e.g., glass) having a refractive index higher than that of air may be used.

Figure 3A:
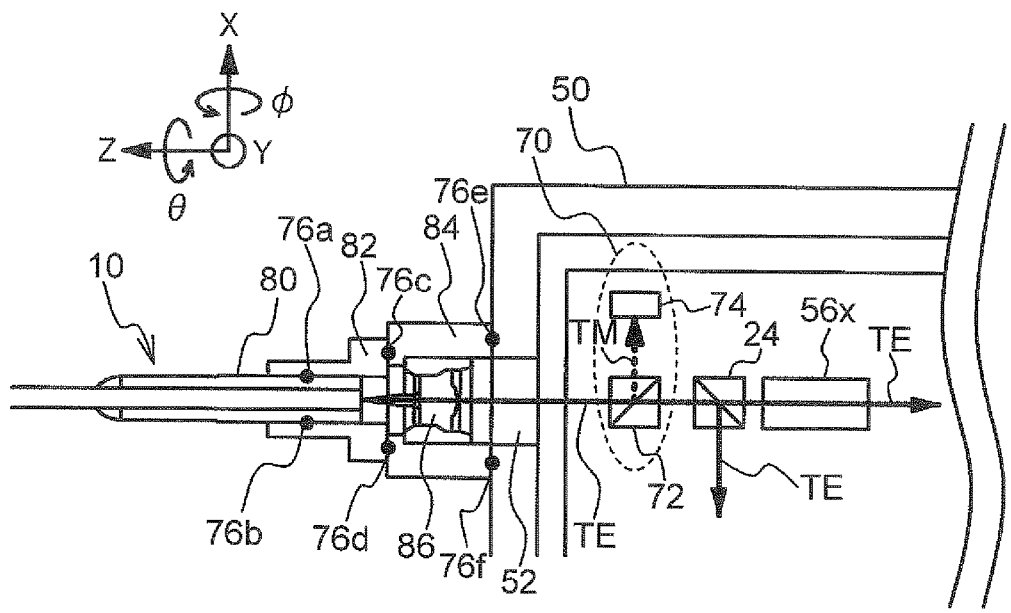
FIG. 3A is an enlarged view of a junction part of a polarization-maintaining optical fiber in the optical receiver in accordance with the first embodiment.
Figure 3B:
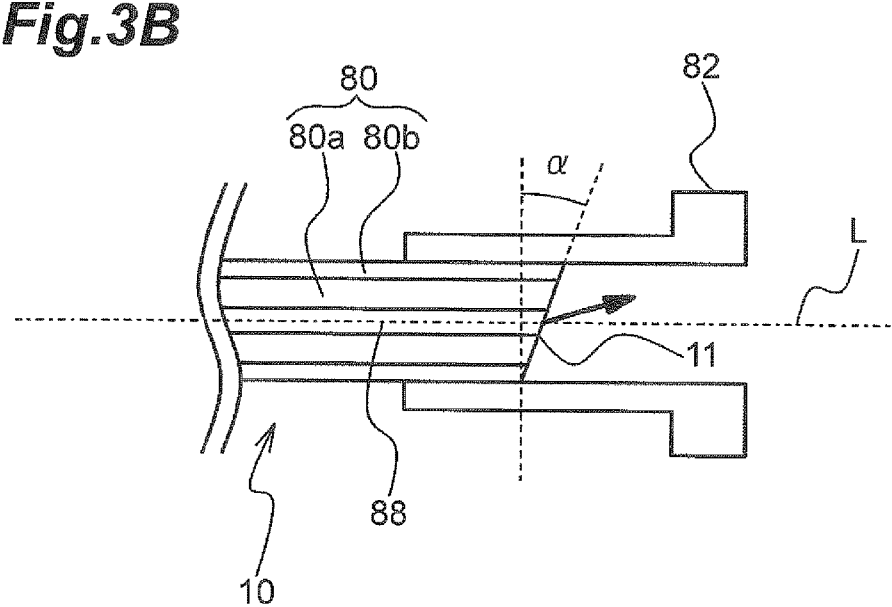
FIG. 3B is an enlarged view of the junction part of the polarization-maintaining optical fiber in the optical receiver in accordance with the first embodiment.

FIG. 3A is a schematic view of a junction part between the polarization-maintaining optical fiber 10 and the package 50, while FIG. 3B is a diagram enlarging the leading, end of the polarization-maintaining optical fiber 10. In FIG. 3A, the optical axis direction of the polarization-maintaining optical fiber 10 is defined as Z direction, a direction perpendicular to the Z direction and parallel to the bottom face of the package 50 as X direction, and a direction (from the front side to rear side of the paper) perpendicular to the X and Z directions as Y direction. On the other hand, θ is the angle of rotation about the Z axis, and φ is the angle of rotation about the X axis.

As illustrated in FIG. 3A, the polarization-maintaining optical fiber 10 comprises a ferrule 80, a ferrule holder 82, and the lens holder 84. The lens holder 84 contains the lens 86 for converting the light emitted from the polarization-maintaining optical fiber 10 into collimated light. As illustrated in FIG. 3B, the ferrule 80 is constituted by an inner ceramic part 80a covering a coated fiber 88 of the polarization-maintaining optical fiber 10 and an outer metal part 80b covering the ceramic part 80a. The leading end part of the ferrule 80 is contained in the ferrule holder 82. An end face 11 of the leading end part of the polarization-maintaining optical fiber 10 is tilted with respect to a plane perpendicular to an optical axis L. The tilt angle α may be at least 4° but not more than 12°, for example.

Here, the ferrule 80 has degrees of freedom of adjustment in the Z, θ, and φ axes. The ferrule holder 82 and lens holder 84 have degrees of freedom of adjustment in the X and Y axes. Thus, the polarization-maintaining optical fiber 10 has various degrees of freedom of adjustment for fixing the same, whereby angular shifts may occur in the process of aligning the optical axis of the polarization-maintaining optical fiber 10.

Figure 4:
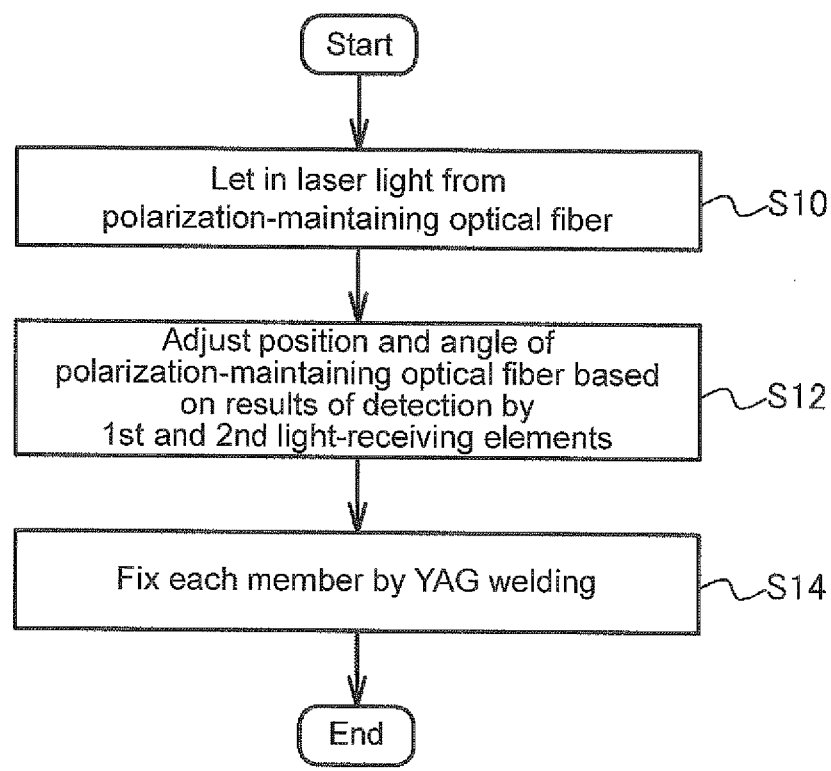
FIG. 4 is a flowchart illustrating an optical axis alignment method of the optical receiver in accordance with the first embodiment.

FIG. 4 is a flowchart illustrating the optical axis alignment method of the optical receiver in accordance with the first embodiment. First, laser light is let into the package 50 from the polarization-maintaining optical fiber 10 (step S10). Here, as illustrated in FIG. 3, the polarization beam splitter 72 disposed upstream of the beam splitter 24 is constructed such as to transmit TE light therethrough but reflect TM light by 90°. In the output light outputted from the polarization beam splitter 72, TE light and TM light correspond to the first output light and second output light, respectively, in this embodiment. The TE light as the first output light is received by the downstream light-receiving elements 30x, 30y, while the TM light as the second output light is received by the downstream light-receiving element 74. In this embodiment, the light-receiving elements 30x, 30y receiving the first output light TE correspond to the first light-receiving element, while the light-receiving element 74 receiving the second output light TM corresponds to the second light-receiving element.

Next, as illustrated in FIG. 4, the position and angle of the polarization-maintaining optical fiber 10 are adjusted according to the results of detection by the first light-receiving elements 30x, 30y and second light-receiving element 74 (step S12).

Figure 5A:
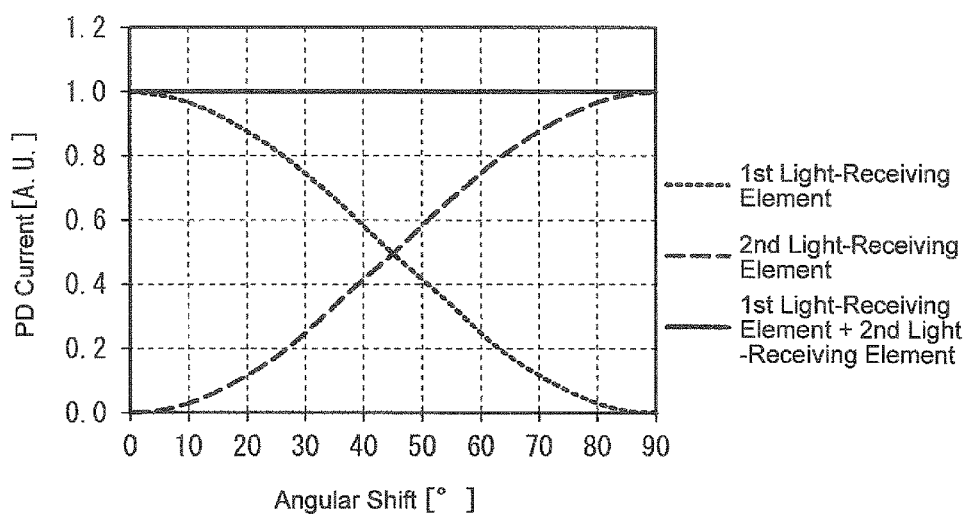
FIG. 5A is a graph illustrating, changes in amounts of light received by light-receiving elements.
Figure 5B:
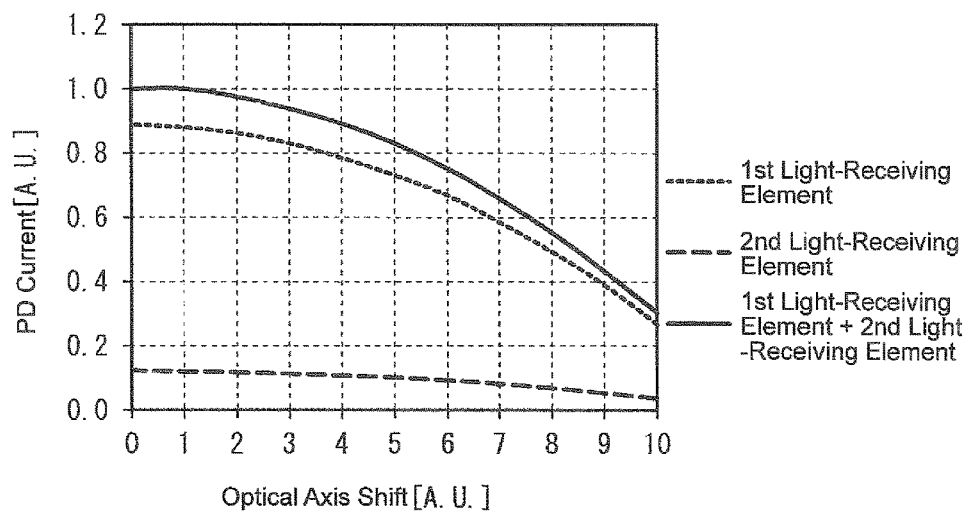
FIG. 5B is a graph illustrating changes in amounts of light received by the light-receiving elements.

FIGS. 5A and 5B are graphs illustrating changes in amounts of light received by the light-receiving elements. FIG. 5A illustrates the relationship between angular shift and PD current for each of the first and second light-receiving elements and their total. The PD current is a current outputted from the light-receiving element and increases as the amount of received light is greater. FIG. 5B illustrates the relationship between optical axis shift and PD current for the amount of light received by each light-receiving element.

In the first light-receiving element receiving the TE light, as illustrated in FIG. 5A, the PD current value becomes greater and smaller as the angular shift is smaller and greater, respectively. In the second light-receiving element receiving the TM light, on the other hand, the PD current value becomes smaller and greater as the angular shift is smaller and greater, respectively. The total of the PD current values in the first and second light-receiving elements is always constant.

In view of the foregoing, it is preferred for the angle of the polarization-maintaining, optical fiber 10 to be adjusted such as to maximize and minimize the PD currents (received light amounts) in the first and second light-receiving elements, respectively, thereby making the angular shift as small as possible. The angle of the polarization-maintaining optical fiber 10 may be adjusted such that the PD currents received light amounts) in the first and second light-receiving elements become at least a first threshold and not greater than a second threshold, respectively. The first and second thresholds may be predetermined fixed values or variable values which are changed as appropriate.

Letting θ(°) be the angular shift from the TE-polarized light, the transmittance of optical power is $\cos^2\theta$ and $\sin^2\theta$ for rectilinear light and reflected light, respectively. When θ=5, the transmittance of optical power is 0.99 and 0.01 for the rectilinear light. ($\cos^2\theta$) and reflected light ($\sin^2\theta$), respectively. When θ=10, the transmittance of optical power is 0.97 and 0.03 for the rectilinear light ($\cos^2\theta$) and reflected light ($\sin^2\theta$), respectively. When θ=20, the transmittance of optical power is 0.88 and 0.12 for the rectilinear light ($\cos^2\theta$) and reflected light ($\sin^2\theta$), respectively.

In the graph of FIG. 5B, on the other hand, each of the first and second light-receiving elements and their total lowers the PD current value as the amount of optical axis shift is greater. Therefore, when correcting the optical axis shift, it is preferred for adjustment to be done such that both of the PD currents (received light amounts) in the first and second light-receiving elements become the maximum values, thereby making the optical axis shift as small as possible.

Referring to FIG. 4, after the adjustment of the position and angle of the polarization-maintaining optical fiber 10 is completed, each member is fixed by YAG welding while keeping the position and angle (step S14). Here, parts 76a to 76f illustrated in FIG. 3A are fixed by the YAG welding. The ferrule 80 and the ferrule holder 82 are fixed at the parts 76a, 76b, the ferrule holder 82 and the lens holder 84 at the parts 76c, 76d, and the lens holder 84 and the package 50 at the parts 76e, 76f. The forgoing fixing deprives the ferrule 80, ferrule holder 82, and lens holder 84 of degrees of freedom of adjustment, whereby the polarization-maintaining optical fiber 10 can be fixed at the predetermined angle and position.

The optical axis alignment of the polarization-maintaining optical fiber 10 in an optical receiver in accordance with a comparative example will now be studied.

Figure 6:
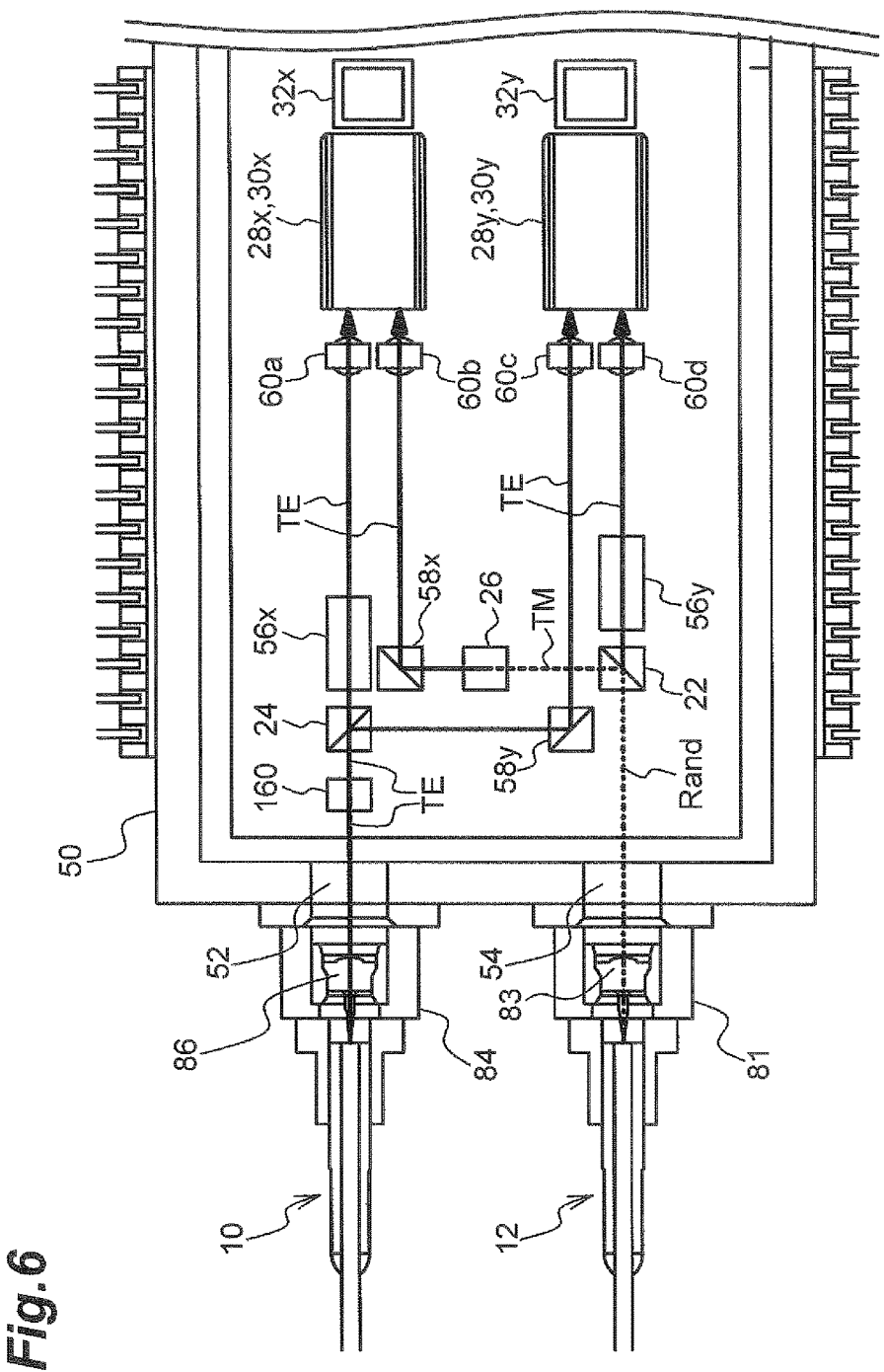
FIG. 6 is a schematic view illustrating an inner structure of an optical receiver in accordance with a comparative example.

FIG. 6 is a schematic view illustrating an inner structure of the optical receiver in accordance with the comparative example. In the comparative example, a polarizer 160 is arranged in place of the light regulation unit 70 in the first embodiment in front of the beam splitter 24. The polarizer 160 is set such as to cut off light other than the TE-polarized component inputted from the polarization-maintaining optical fiber 10. The optical receiver in accordance with the comparative example is equipped with the first light-receiving elements 30x, 30y for monitoring the TE light, but not the second light-receiving element (light-receiving element 74 of FIG. 2) for monitoring the TM light. The remaining structure, is common with the first embodiment (FIG. 2) and thus will not be explained in detail.

Figure 7:
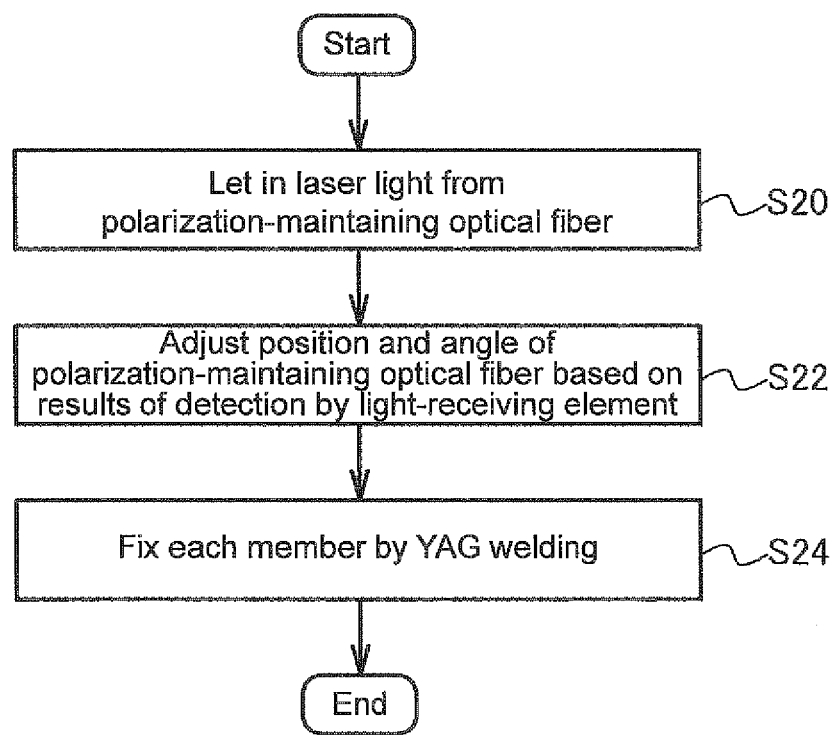
FIG. 7 is a flowchart illustrating an optical axis alignment method of the optical receiver in accordance with the comparative example.

FIG. 7 is a flowchart illustrating the optical axis alignment method of the optical receiver in accordance with the comparative example. First, as in the first embodiment, laser light is let into the package 50 from the polarization-maintaining optical fiber 10 (step S20). Subsequently, while monitoring the light-receiving elements, the position and angle of the polarization-maintaining optical fiber 10 are adjusted according to the results of detection by the monitoring (step S22). After the adjustment of the position and angle of the polarization-maintaining optical fiber 10 is completed, each member is fixed by YAG welding while keeping the position and angle (step S24) as in the first embodiment.

When the position or angle of the polarization-maintaining optical fiber 10 shifts in the comparative example, light other than the TE-polarized component is cut off by the polarizer 160, whereby optical losses occur in the light-receiving elements 30x, 30y according to the magnitude of the angular shift. Specifically, letting θ(°) be the angular shift from the TE-polarized light, the transmittance of optical power is $\cos^2\theta$. When θ=5, the transmittance of optical power is $\cos^2\theta$=0.99. When θ=10, the transmittance of optical power is $\cos^2\theta$=0.97. When θ=20, the transmittance of optical power is $\cos^2\theta$=0.88. Thus, monitoring the light-receiving elements 30x, 30y makes it possible to detect shifts in the position or angle of the polarization-maintaining optical fiber. Adjusting, the position and angle of the polarization-maintaining optical fiber 10 such as to maximize the received light amounts (PD currents) in the light-receiving elements 30x, 30y can maximize the amount of TE light incident on the optical hybrid 28x.

However, as illustrated in FIGS. 5A and 5B, the PD current in the first light-receiving element may be lowered by any of angular and optical axis shifts. Therefore, the comparative example equipped with no second light-receiving element is hard to determine whether the decrease in PD current is caused by an angular shift or optical axis shift. As a result, even if the polarization-maintaining optical fiber is fixed at a location where the PD currents of the light-receiving elements are maximized, a large angular shift (e.g., 20°) may occur, which makes it hard to align optical axes accurately.

When the end face 11 of the polarization-maintaining optical fiber 10 is tilted as illustrated in FIG. 3B in particular, light is emitted from the polarization-maintaining optical fiber 10 in a direction oblique to the optical axis L. Therefore, when the polarization-maintaining optical fiber 10 rotates, the light emission direction changes greatly, whereby the optical axis alignment becomes more difficult.

By contrast, the optical receiver in accordance with this embodiment can accurately calculate the magnitude of angular shift from the output ratio of PD currents in the first and second light-receiving elements. As a result, the angular shift at the time of adjustment can be reduced. For example, the angular shift, which is up to about 20° in the comparative example, can be suppressed to 10° or less in this embodiment. In terms of optical loss, it can greatly be improved from 12% in the comparative example to about 3% in this embodiment.

In view of the foregoing, the optical receiver and its optical axis alignment method in accordance with this embodiment can enhance the accuracy in optical axis alignment of the polarization-maintaining optical fiber 10.

Second Embodiment

Figure 8:
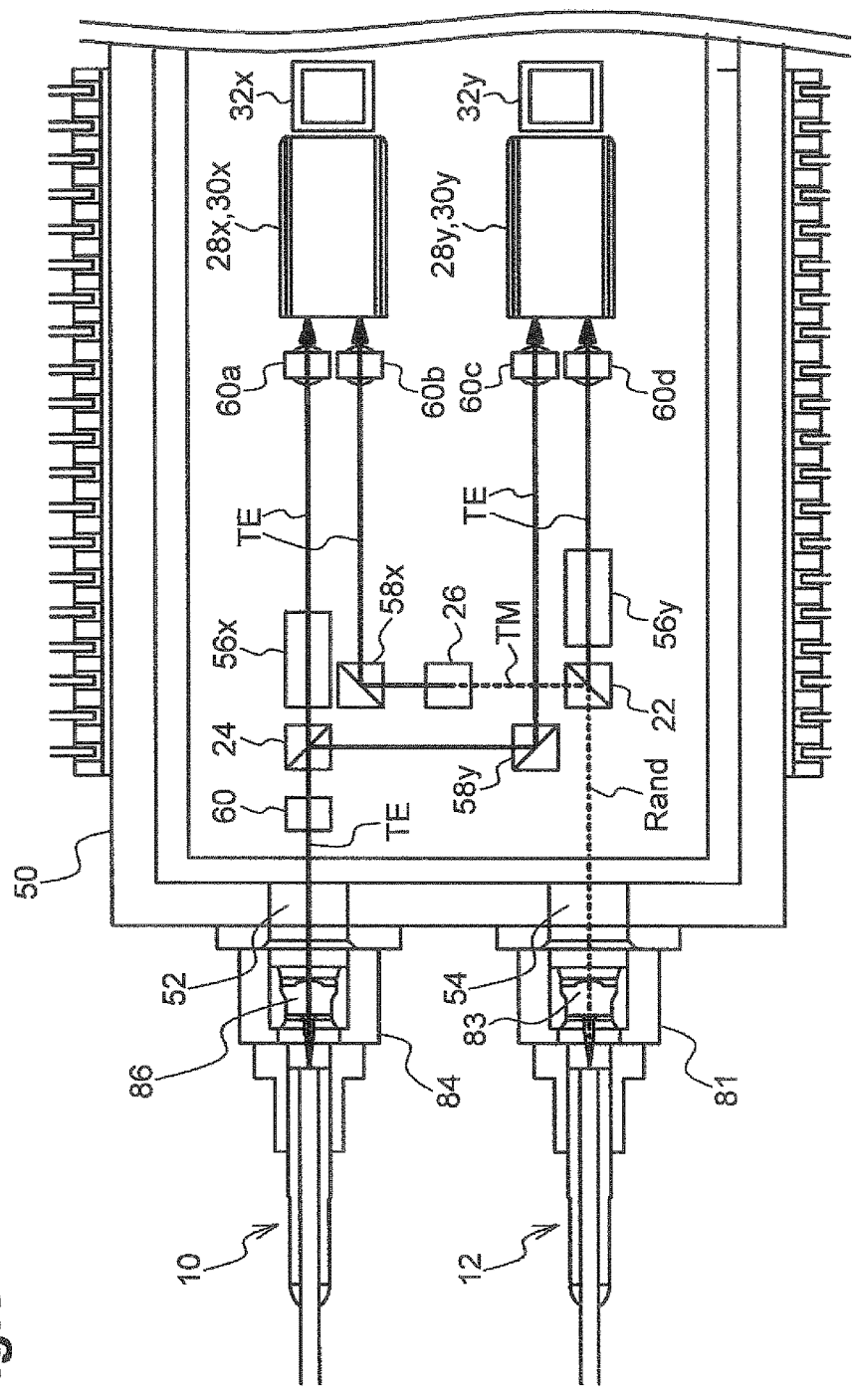
FIG. 8 is a schematic view illustrating an inner structure of an optical receiver in accordance with a second embodiment.

FIG. 8 is a schematic view illustrating an inner structure of the optical receiver in accordance with the second embodiment. In the second embodiment, a polarizer 60 is arranged in place of the light regulation unit 70 in the first embodiment in front of the beam splitter 24. The polarizer 60 is set such as to cut off light other than the TE-polarized component inputted from the polarization-maintaining optical fiber 10. The remaining structure is common with the first embodiment (FIG. 2) and thus will not be explained in detail.

Figure 9A:
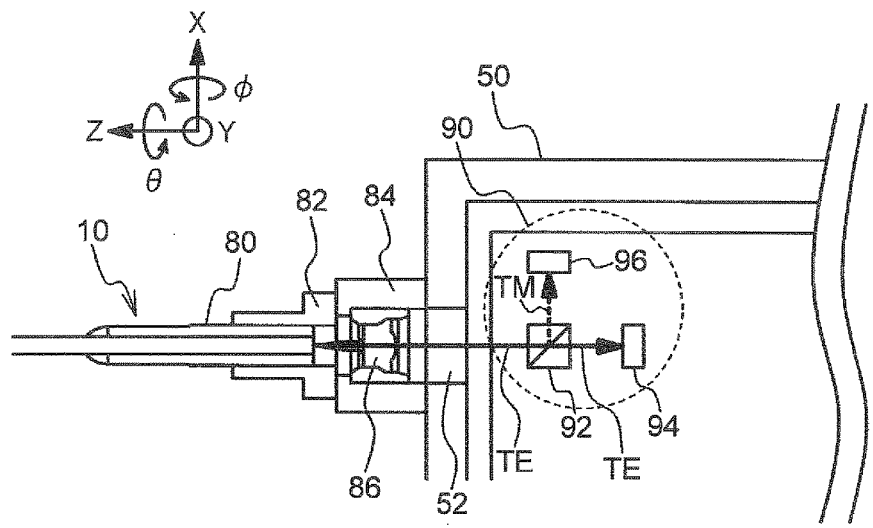
FIG. 9A is a schematic view illustrating a process of optical axis alignment of the optical receiver in accordance with the second embodiment.
Figure 9B:
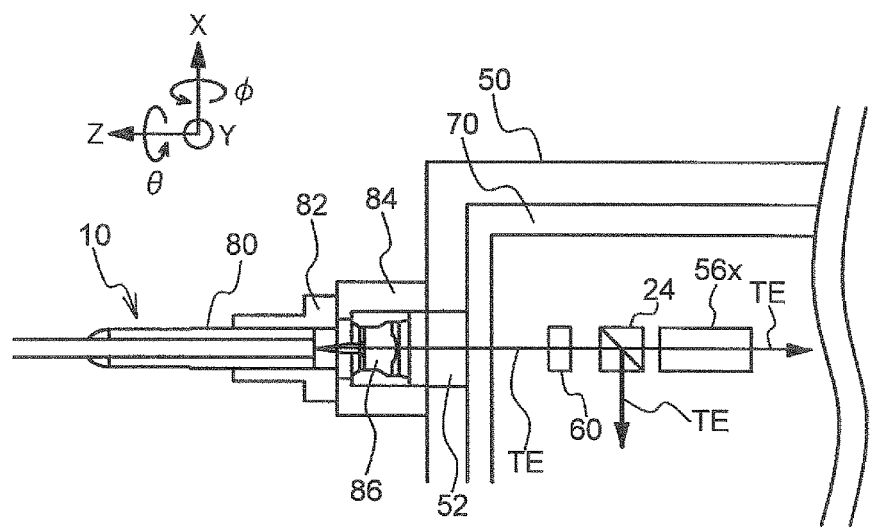
FIG. 9B is a schematic view illustrating the process of optical axis alignment of the optical receiver in accordance with the second embodiment.

FIGS. 9A and 9B are schematic views illustrating the process of optical axis alignment of the optical receiver in accordance with the second embodiment. FIG. 9A is a schematic view illustrating the state at the time of starting the optical axis alignment, in which a light regulation unit 90 is provided within the package 50. The light regulation unit 90 is constituted by a polarization beam splitter 92 and two light-receiving elements 94, 96. The polarization beam splitter 92 is set such as to allow TE light to advance straight therethrough and reflect TM light by 90°. In the output light from the polarization beam splitter 92, the TE light as the first output light is inputted to the first light-receiving element. 94, while the TM light as the second output light is inputted to the second light-receiving element 96. The first and second light-receiving elements 94, 96 are arranged equidistantly from the polarization beam splitter 92.

FIG. 9B is a schematic view illustrating the state at the end of optical axis alignment. In FIG. 9B, a dummy element with the light regulation unit 90 in FIG. 9A is removed and replaced with an actual element illustrated in FIG. 8. The other actual elements are not depicted in FIG. 9B.

Figure 10:
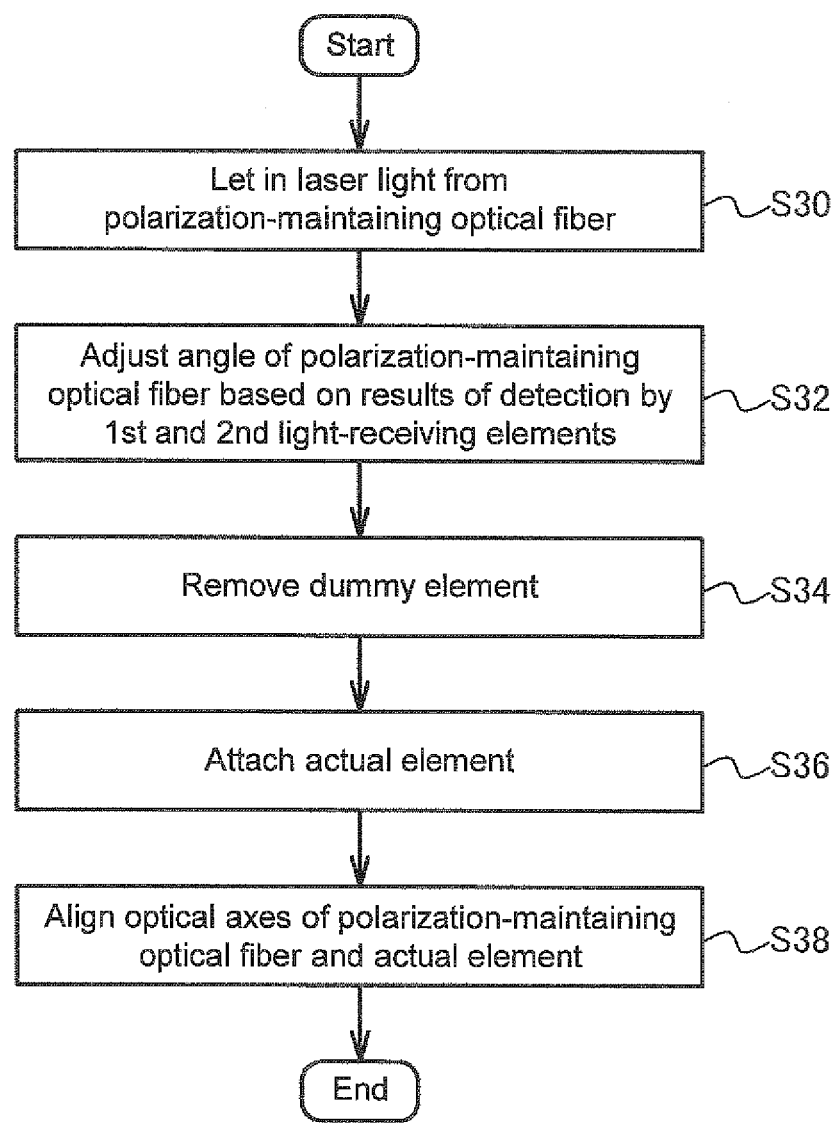
FIG. 10 is a flowchart illustrating an optical alignment method of the optical receiver in accordance with the second embodiment.

FIG. 10 is a flowchart illustrating the optical axis alignment method of the optical receiver in accordance with the second embodiment. By the time of starting the optical axis alignment, the dummy element with the light regulation unit 90 has already been arranged. First, laser light is let into the package 50 from the polarization-maintaining optical fiber 10 (step S30). Subsequently, while monitoring the first and second light-receiving elements 94, 96, the position and angle of the polarization-maintaining optical fiber 10 are adjusted according to the results of detection by the first and second light-receiving elements 94, 96 (step S32). These are the same as with the optical axis alignment method of the optical receiver in accordance with the first embodiment.

Next, the dummy element with the light regulation unit 90 is removed (step S34). Thereafter, the dummy element is replaced with the actual element (step S36). The steps S34 and S36 keep the angle of the polarization-maintaining optical fiber 10 determined by the step S32. After the mounting of the actual element is completed, optical axes of the actual elements of the polarization-maintaining optical fiber 10 are aligned (step S38). At this time, the position of the polarization-maintaining optical fiber 10 or the positions or angles of the other optical elements may be changed, but the angle of the polarization-maintaining optical fiber 10 is kept unchanged.

The optical receiver and its optical axis alignment method in accordance with the second embodiment, adjust the angle of the polarization-maintaining optical fiber 10 by using the dummy element at the time of assembling and replace the dummy element with the actual element while keeping the angle. This can suppress the angular shift in the polarization-maintaining optical fiber 10 and improve the accuracy in optical axis alignment as with the first embodiment.

The structure in accordance with the second embodiment finally removes the dummy light regulation unit including the polarization beam splitter 92 and thus can make the number of components smaller than that in the first embodiment, thereby cutting cost down. In the structure in accordance with the second embodiment, the first and second light-receiving elements 94, 96 are arranged equidistantly from the polarization beam splitter 92. This can reduce the difference in light-receiving sensitivity between two light-receiving elements 94, 96, thereby making it possible to detect the angular shift of the polarization-maintaining optical fiber 10 more accurately.

Third Embodiment

Figure 11:
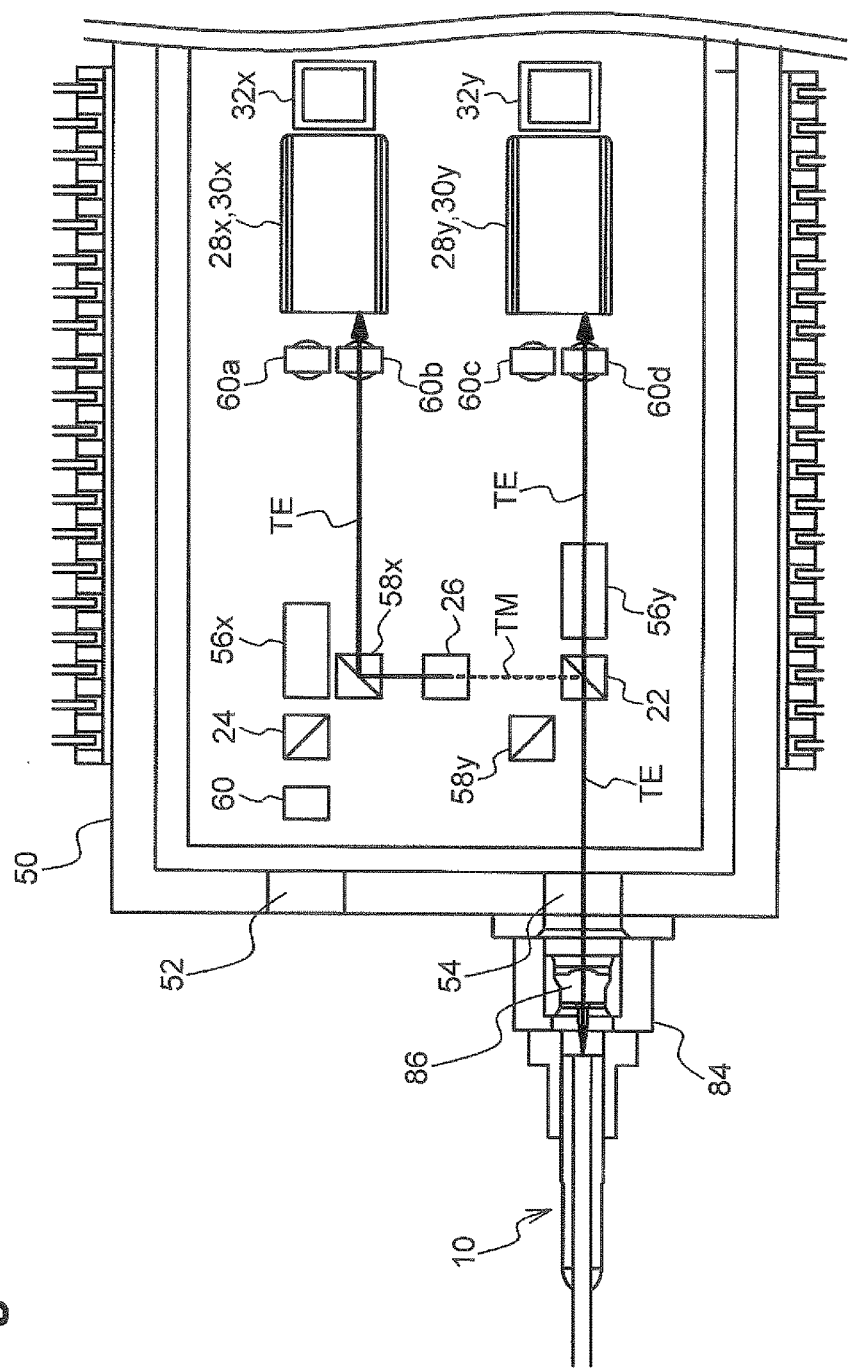
FIG. 11 is a schematic view (part 1) illustrating a process of optical axis alignment of the optical receiver in accordance with a third embodiment.
Figure 12:
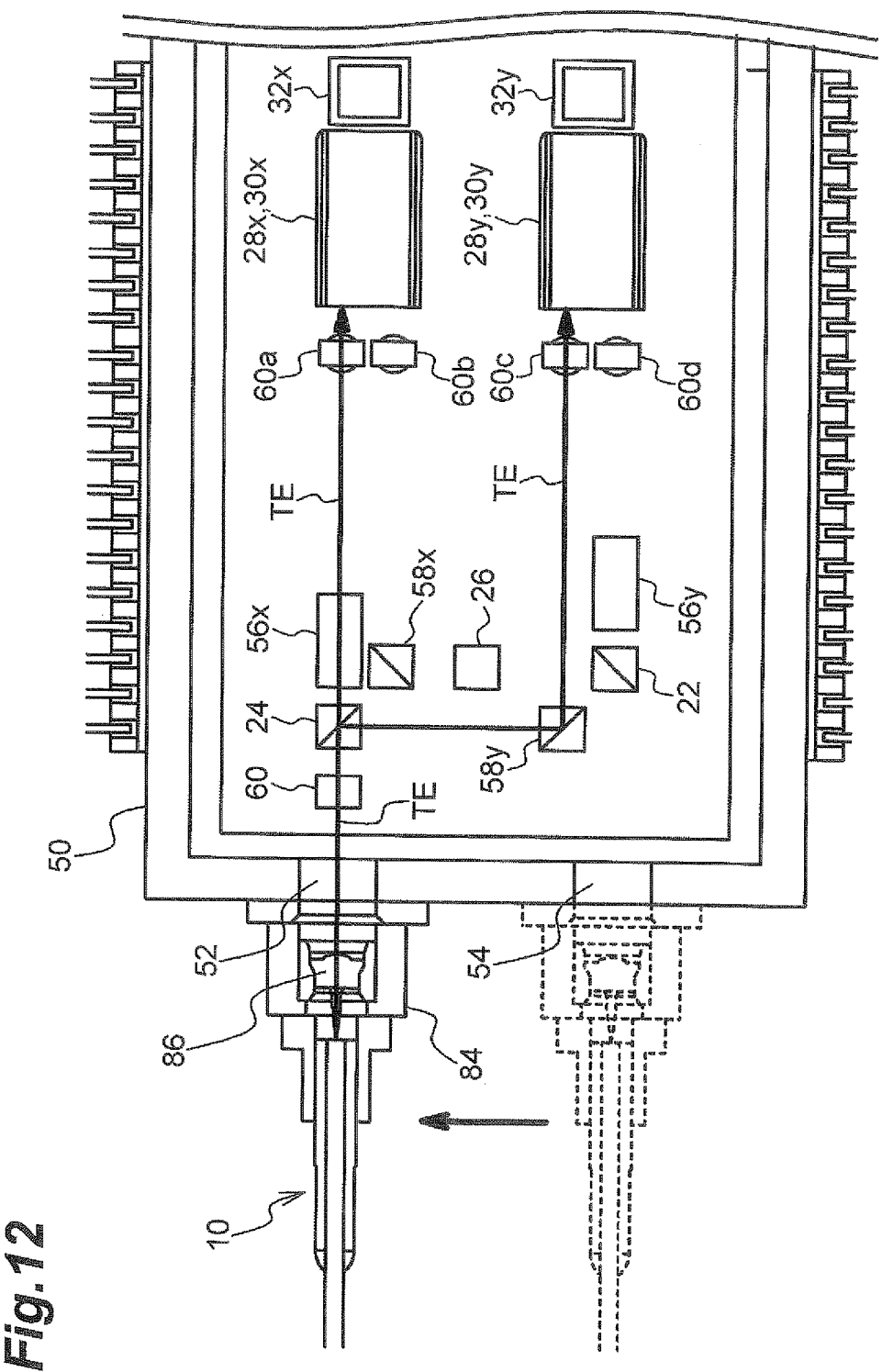
FIG. 12 is a schematic view (part 2) illustrating the process of optical axis alignment of the optical receiver in accordance with the third embodiment.

FIGS. 11 and 12 are schematic views illustrating the process of optical axis alignment of the optical receiver in accordance with the third embodiment. FIGS. 11 and 12 illustrate respective states at the start and end of optical axis alignment. The inner structure of the package 50 in FIGS. 11 and 12 is common with the second embodiment (FIG. 8).

As illustrated in FIG. 11, the polarization-maintaining optical fiber 10 is fixed to the second input window 54 at the time of starting the optical axis alignment. The second input window 54 is the one to which the single-mode optical fiber 12 is supposed to be fixed. TE light coming from the polarization-maintaining optical fiber 10 is inputted to the polarization beam splitter 22. As mentioned above, the polarization beam splitter 22 is set such as to allow TE light to advance straight therethrough and reflect TM light by 90°. Therefore, the TE light as the first output light from the polarization beam splitter 22 is inputted to the light-receiving element 30y through the skew adjustment element 56y and lens 60d. In this embodiment, the light-receiving element 30y functions as the first light-receiving element for receiving the first output light.

The TM light as the second output light from the polarization beam splitter 22 is inputted to the light-receiving element 30x by way of the polarization rotator 26, mirror 58x, and lens 60b. In this embodiment, the light-receiving element 30x functions as the second light-receiving element for receiving, the second output light.

Figure 13:
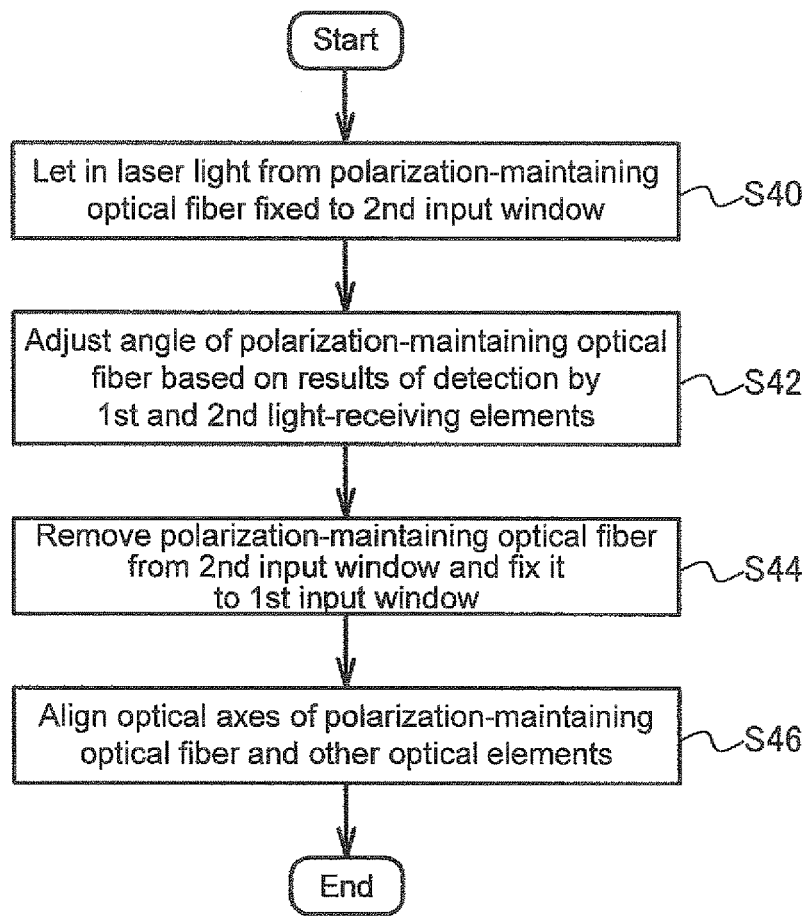
FIG. 13 is a flowchart illustrating an optical alignment method of the optical receiver in accordance with the third embodiment.

FIG. 13 is a flowchart illustrating the optical axis alignment method of the optical receiver in accordance with the third embodiment. First, laser light is let in from the polarization-maintaining optical fiber 10 fixed to the second input window 54 (step S40). Subsequently, the first and second light-receiving elements 30x, 30y are monitored, and the angle of the polarization-maintaining optical fiber 10 is adjusted according to the results of detection by the monitoring (step S42).

Next, as illustrated in FIG. 12, the polarization-maintaining, optical fiber 10 is removed from the second input window 54 and fixed to the first input window 52 to which it is supposed to be fixed (step S44). At this time, the polarization-maintaining optical fiber 10 is moved by sliding while keeping its angle. After completing the movement of the polarization-maintaining optical fiber 10, optical axes of the actual element of the polarization-maintaining, optical fiber 10 are aligned (step S46). At this time, the position of the polarization-maintaining optical fiber 10 or the positions or angles of the other optical elements may be changed, but the angle of the polarization-maintaining optical fiber 10 is kept unchanged.

The optical receiver and its optical axis alignment method in accordance with the third embodiment can monitor the TE tight and TM light by utilizing the polarization beam splitter 22 and light-receiving elements 30x, 30y, which constitute an optical system on the signal light side. This can suppress the angular shift of the polarization-maintaining optical fiber 10 and improve the accuracy in optical axis alignment as with the first embodiment.

The structure in accordance with the third embodiment does not use constituents such as the light regulation unit 70 in the first embodiment and the dummy light regulation unit 90 in the second embodiment and thus can thither cut the manufacturing cost down as compared with the first and second embodiments.

While the first to third embodiments set forth TE light, as an example of the local oscillator light (LO) introduced from the polarization-maintaining optical fiber 10, TM light can be used in place of the TE light.

While embodiments of the present invention are explained in detail in the foregoing, the present invention is not limited to such specific embodiments but can be modified and altered within the scope of the gist thereof set forth in claims.

What is claimed is:

1. An optical axis alignment method of an optical receiver that comprises a package, first and second optical-electrical signal converters, and a polarization-maintaining optical fiber, the first and second optical-electrical signal converters being set within the package, the package having first and second input windows, the polarization-maintaining optical fiber being fixable to the second input window; the method comprising:

a first step of adjusting an angle of the polarization-maintaining optical fiber at the second input window according to results of detection by the first and second optical-electrical signal converters;

a second step of moving the polarization-maintaining optical fiber from the second input window and to the first input window while keeping the angle of the polarization-maintaining optical fiber; and a third step of aligning an optical axis of the polarization-maintaining optical fiber at the first input window while keeping the angle of the polarization-maintaining optical fiber.

2. The optical axis alignment method according to claim 1, wherein the first step of adjusting the angle of the polarization-maintaining optical fiber is carried out such that an amount of light received by the first optical-electrical signal converter is at least a first threshold while an amount of light received by the second optical-electrical signal converter is not greater than a second threshold.

3. The optical axis alignment method according to claim 2, wherein the package further includes a polarization beam splitter optically coupled with the second input window, the polarization beam splitter receiving light outputted from the polarization-maintaining optical fiber set in the second input window and outputs first output light as TE-polarized light that optically couples with the first optical-electrical signal converter and second output light as TM-polarized light that optically couples with the second optical-electrical signal converter; and wherein the first step of adjusting the polarization-maintaining fiber is carried out such that the TE-polarized light outputted from the polarization-maintaining optical fiber has an angle of polarization of 10° or less.

4. The optical axis alignment method according to claim 1, wherein the second step of moving the polarization-maintaining optical fiber from the second input window includes a step of sliding the polarization-maintaining optical fiber from the second input window to the first input window while keeping its angle.

5. The optical axis alignment method according to claim 1, wherein the first step of adjusting the angle of the polarization-maintaining optical fiber includes a step of inputting light provided from an external local oscillator into the polarization-maintaining optical fiber.

* * * * *